United States Patent [19]
Anderson

[11] 3,827,617
[45] Aug. 6, 1974

[54] HELICAL WEB PATH PROCESSING DEVICE UTILIZING FORCE COUNTER-ACTING SPOOLS

[75] Inventor: Robert I. Anderson, Rochester, N.Y.

[73] Assignee: Eastman Kodak Company, Rochester, N.Y.

[22] Filed: Apr. 16, 1973

[21] Appl. No.: 351,205

[52] U.S. Cl............ 226/118, 95/94 R, 95/89 A, 226/190
[51] Int. Cl............................................ B65h 17/42
[58] Field of Search .......... 226/108, 118, 189, 190, 226/191; 95/94 R, 89 A

[56] References Cited
UNITED STATES PATENTS

| | | | |
|---|---|---|---|
| 1,837,223 | 12/1931 | Kohlmeier | 226/190 X |
| 2,967,473 | 1/1961 | Good | 95/94 R |
| 3,333,753 | 8/1967 | Streets | 226/97 |
| 3,493,161 | 2/1970 | Billings et al. | 226/190 |
| 3,724,355 | 4/1973 | Bush et al. | 95/94 R |

Primary Examiner—M. Henson Wood, Jr.
Assistant Examiner—Gene A. Church
Attorney, Agent, or Firm—S. W. Gremban

[57] ABSTRACT

A helical web or film path processing device utilizing force counteracting spools for generating a force on the film to counteract the normal tracking force on the film generated by the film approaching a spool non-perpendicular to the spool axis. The tracking force tends to cause the film to climb the spool flanges, twist, fold over and in some situations to be damaged. The force counteracting spool has a tapered or frustum-shaped hub in which the hub end of smallest diameter is adjacent the trailing flange of the spool in the lateral direction of film movement.

6 Claims, 6 Drawing Figures

PATENTED AUG 6 1974　　　　　3,827,617

3,827,617

HELICAL WEB PATH PROCESSING DEVICE UTILIZING FORCE COUNTER-ACTING SPOOLS

BACKGROUND OF THE INVENTION

1. Field of the Invention

This invention relates generally to processing apparatus, and more specifically to a helical web or film path processing device having force counteracting film spools for counteracting the tracking force normally exerted against a film generated by the film approaching a spool non-perpendicular to the spool axis.

2. Description of the Prior Art

Processing apparatus such as photographic processing apparatus of the type comprising a plurality of film racks in which each rack has a top and bottom spool assembly aligned to progressively transport film from one end of the rack to the other along a helical film path are well known in the art. In a typical helical film path processing rack, the top and bottom spools are mounted on parallel shafts lying in the same plane and to obtain the desired helical film path, the film is displaced laterally at least half its width during its travel between the upper and lower rollers. Such film displacement causes the film to approach the spool non-perpendicular to the spool axis resulting in the generation of a tracking force on the film tending to return the film to a position normal or perpendicular to the spool axis. This tracking force is resisted by the trailing flanges of the spools (in the lateral direction of the film movement) which exert a guiding force on the film edge in opposition to the tracking force. Such trailing flanges guide the film relatively satisfactorily with films having a sufficiently thick support, such as 5 mils thickness or greater. However, in those situations in which the film support is thinner, such as substantially 2.5 mils, the film does not in all situations respond to the guiding force applied to it by the trailing spool flanges causing the film to buckle, twist, climb the spool flanges, or fold over, resulting in problems such as improper processing and film edge damage.

SUMMARY OF THE INVENTION

In accordance with a preferred embodiment of the invention, a helical web or film path processing device is disclosed having incorporated therein force counteracting film spools. The film spools have force generating means on the hub thereof for generating a force on the film in a direction opposed to the tracking force generated as a result of the film approaching a film spool non-perpendicular to the spool axis. In one embodiment, the force generating means comprises a frustum-shaped hub in which the hub end of smallest diameter is adjacent the trailing spool flange in the lateral direction of film movement. Such trailing flange further exerts a guiding force on the film in opposition to the tracking force. In another embodiment, the force generating means comprises a tire mounted on the hub in which the outer diameter of the tire adjacent the trailing flange is less than the outer diameter of the tire adjacent the leading flange in the lateral direction of film movement.

A primary advantage of the present invention is to provide an improved helical film path processing device in which the tracking force on the film generated by the misaligned helical film is counteracted to achieve proper film tracking without damage to the film.

One of the objects and advantages of the present invention is to provide an improved helical film path processing device having incorporated therein improved film spools having force generating means on the hub for generating a force on the film in opposition to the tracking force generated by the film approaching a film spool non-perpendicular to the spool axis.

Another object and advantage of the invention is to provide improved film spools incorporated in a helical film path processing device for counteracting the tracking force exerted on the film, and which are of simple design and construction, thoroughly reliable and efficient in operation, and economical to manufacture.

The invention and its objects and advantages will become more apparent from the detailed description of the preferred embodiments presented below.

BRIEF DESCRIPTION OF THE DRAWING

In the detailed description of the preferred embodiment of the invention presented below, reference is made to the accompanying drawing, in which.

DESCRIPTION OF THE PREFERRED EMBODIMENTS

Because processing apparatus are well known, the present description will be directed in particular to elements forming part of, or cooperating more directly with, apparatus in accordance with the present invention. Elements of a processing apparatus not specifically shown or described herein should be understood to be selectable from those known in the art.

Figure 1:
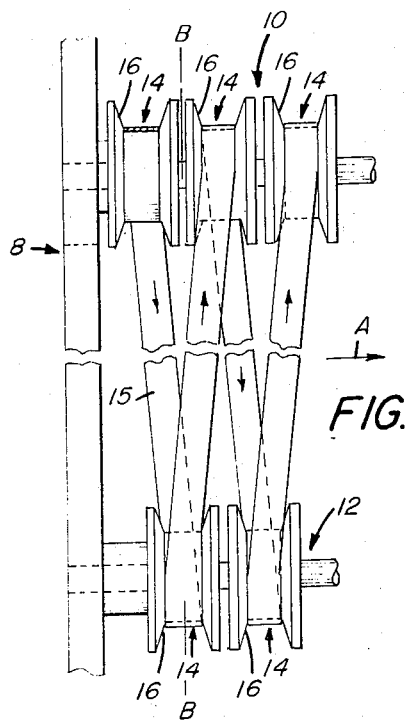
FIG. 1 is a segmental, front elevational view illustrating a prior art helical film path processing rack for transporting a film along a helical path from one end of the rack to the other end.
Figure 2:
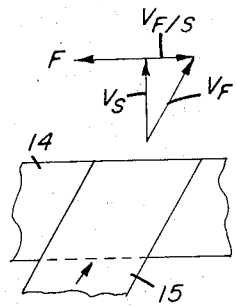
FIG. 2 is a segmental view of a portion of a cylindrical hub film spool of the type incorporated in FIG. 1 in which the tracking force exerted on the film generated by the film approaching the spool non-perpendicular to the spool axis is vectorially illustrated.

With reference to FIG. 1 of the drawing, a segment of a film rack 8 is disclosed of the type generally in use in a helical film path processing apparatus such as a photographic processing apparatus. The processing apparatus comprises top and bottom film spool assemblies 10, 12 respectively with the spools 14 aligned so that a film 15 is progressively transported laterally in the direction of arrow "A" from one end of the rack to the other along a helical path. Such alignment involves axially displacing each spool 14 substantially half of its width on one axis from the complimentary or corresponding spool on the other axis. In other words, the center of each spool 14 is in register with a point between two proposed spools on the other axis as indicated by line B—B of FIG. 1. Accordingly, in achieving the helical path in FIG. 1, the film is displaced laterally substantially half its width during its travel from the lower spool to the upper spool. Such film displacement causes the film to approach the spool nonperpendicular to the spool axis resulting in the generation of a tracking force on the film tending to return the film to a position perpendicular to the spool axis. This tracking force designated "F" in FIG. 2 is believed to act in opposition to a velocity vector $V_{F/R}$ resulting from the spool velocity $V_S$ and the film velocity $V_F$ where the spool hub is cylindrical, and is resisted by a trailing flange 16 in the lateral direction of film movement. If the film is sufficiently thin, the tracking force can cause the film to buckle, climb spool flange 16, twist, fold over, or become permanently edge-damaged.

Figure 3:
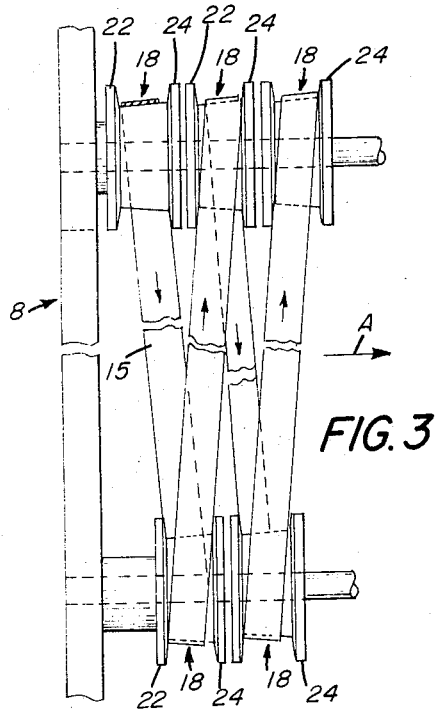
FIG. 3 is a segmental, front elevational view similar to FIG. 1 illustrating a helical film path processing rack in which the improved film spool of this invention is incorporated.
Figure 4:
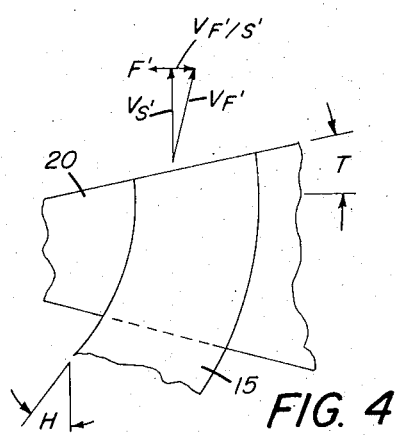
FIG. 4 is a segmental view of a portion of a film spool of the type incorporated in FIG. 3 in which the force generated by the new spool in opposition to the tracking force is vectorially illustrated.
Figure 5:
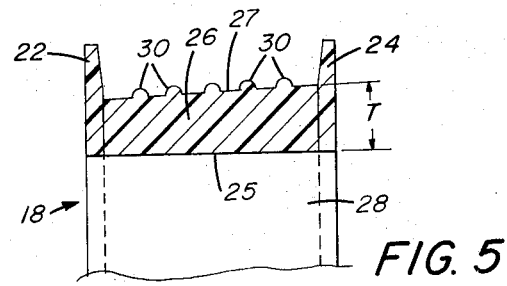
FIG. 5 is a segmental view in section of one embodiment of the improved film spool of this invention.
Figure 6:
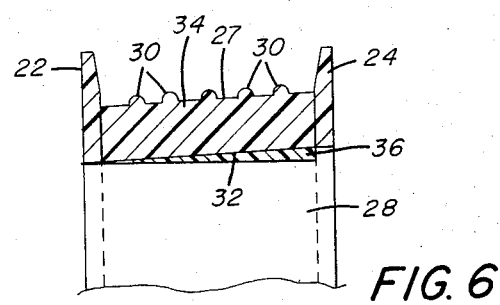
FIG. 6 is a segmental view in section of another embodiment of the improved film spool of this invention.

With reference to FIG. 3 of the drawing, a film rack 8 is disclosed having incorporated therein a preferred embodiment of the improved tracking force counteracting film spools 18 of this invention. In such embodiments, each of the film spools 18 comprises a frustum-shaped hub 20 (FIG. 4) interposed between a pair of flanges 22, 24. It is essential that the frustum-shaped hub 20 have its end of greater diameter adjacent the leading flange 24 in the direction of "A" of film movement, and its end of smaller diameter adjacent the trailing flange 22. A hub of frustum-shape as illustrated in FIG. 4 is believed to generate a force counteracting or minimizing the tracking force "F" on the film. In the vector diagram illustrated therein, the frustum-shaped hub is believed to cause the film to become distorted or bent as indicated in exaggerated form. The velocity vectors of the spool $V_S$ and film $V_F$ as directed result in a relative velocity $V_{F/S}$ less than the velocity $V_{F/S}$ directed toward the leading flange 22. Velocity $V_{F/S}$ generates a force "F'" acting in the opposite direction from the velocity vector and of a value less than "F." . Accordingly, with the frustum-shaped hub, the film is moved toward trailing flange 22 but with less force than with the cylindrical hub. By proper selection of the hub taper T, film tension, film velocity and hub velocity, it is believed possible to minimize the tracking force "F'" so that the film in engagement with trailing flange 22 does not buckle, bend, fold over, or become damaged. Presumably, if the proper parameters are selected such that the spool and film velocity vectors $V_S$ and $V_F$ are equal, no tracking force "F'" would be exerted on the film It has been found in practice that if the angle of taper "T" of the hub is equal to the helix angle "H," the tracking force "F'" is significantly reduced. The frustum-shaped hub 20 can be readily achieved by providing a tire 26 (FIG. 5) having an inner cylindrical surface 25 and an outer frustum-shaped surface 27 and which can be readily mounted on the cylindrical hub 28 of a normal film spool. The tire 26 is preferably provided with a plurality of radially extending fingers 30 to more effectively grip the film for transport thereof. In another alternative for obtaining a frustum-shaped hub illustrated in FIG. 6, a tire having cylindrical inner and outer surfaces 32, 34 respectively can be used, and a tapered sleeve 36 of plastic or the like interposed between inner surface 32 and the cylindrical hub 28. Sleeve 36 need not be tapered, but can be of any desired shape to achieve a spool having a generally frustum-hub.

The invention has been described in detail with particular reference to preferred embodiments thereof, but it will be understood that variations and modifications can be effected within the spirit and scope of the invention as described hereinabove.

We claim:

1. In a helical web path processing device of the type having a plurality of web supporting racks in succession, the combination comprising:
   a pair of spaced apart shafts on each rack for supporting the hubs of a plurality of web spools, said spools being vertically displaced from one another for guiding a web in a helical path from one end of the shafts to the opposite end in one direction with the displaced web approaching each spool nonperpendicular to the spool axis, said displaced web generating a tracking force tending to move said web in a direction opposite to said one direction, to a position perpendicular to the spool axis; and
   force generating means on each of said spools for generating a force on the web in a direction opposed to said tracking force, said force generating means comprising a web supporting surface on said hub in which the radius at a leading end of said web supporting surface in said one direction is greater than the radius at the trailing end of said web supporting surface.

2. The invention according to claim 1 wherein said hub is frustum-shaped and the diameter of the hub at the leading hub end in said one direction is larger than the diameter at the trailing hub end.

3. The invention according to claim 1 wherein said force generating means comprises a tire mounted on said hub and having said web supporting surface in which the radius at a leading end of said tire in said one direction is greater than the radius at the trailing end of said tire.

4. The invention according to claim 3 wherein said web supporting surface is frustum-shaped.

5. The invention according to claim 1 wherein said force generating means comprises a cylindrical tire mounted on said hub, and a sleeve interposed between said hub and said tire at a leading end of said hub in said one direction.

6. The invention according to claim 5 wherein said sleeve has an outer conical surface.

\* \* \* \* \*

PO-1050
(5/69)

UNITED STATES PATENT OFFICE
CERTIFICATE OF CORRECTION

Patent No. __3,827,617__  Dated __September 6, 1974__

Inventor(s) __Robert I. Anderson__

It is certified that error appears in the above-identified patent and that said Letters Patent are hereby corrected as shown below:

Column 3, line 35 delete "$V_S$" and insert --$V_{S'}$--.

Column 3, line 35, delete "$V_F$" and insert --$V_{F'}$--.

Column 3, line 36, delete "$V_{F/S}$" and insert --$V_{F'/S'}$--.

Column 3, line 38, delete "$V_{F/S}$" and insert --$V_{F'/S'}$--.

Column 3, line 49, delete "$V_S$ and $V_F$" and insert --$V_{S'}$ and $V_{F'}$--

Column 3, line 50, insert period after the word "film".

Signed and sealed this 3rd day of December 1974.

(SEAL)
Attest:

McCOY M. GIBSON JR.
Attesting Officer

C. MARSHALL DANN
Commissioner of Patents